(12) United States Patent
Khoshgard et al.

(10) Patent No.: US 8,675,749 B2
(45) Date of Patent: Mar. 18, 2014

(54) CHANNEL ESTIMATION IN OFDM TRANSMISSION SYSTEM AND METHOD

(75) Inventors: Mahdi Khoshgard, San Jose, CA (US); Vahid Mesgarpour Toosi, Mountain View, CA (US)

(73) Assignee: SiTune Corporation, San Jose, CA (US)

( * ) Notice: Subject to any disclaimer, the term of this patent is extended or adjusted under 35 U.S.C. 154(b) by 98 days.

(21) Appl. No.: 12/790,743

(22) Filed: May 28, 2010

(65) Prior Publication Data

US 2011/0293050 A1 Dec. 1, 2011

(51) Int. Cl.
*H04L 27/28* (2006.01)

(52) U.S. Cl.
USPC ........... 375/260; 375/259; 375/267; 375/299; 370/208; 370/210; 370/328; 370/335; 370/441; 370/334; 370/500; 370/203

(58) Field of Classification Search
USPC .......... 375/260, 267; 370/203, 208, 210, 328, 370/334, 335, 441, 500
See application file for complete search history.

(56) References Cited

U.S. PATENT DOCUMENTS

| | | | | |
|---|---|---|---|---|
| 7,248,559 | B2* | 7/2007 | Ma et al. | 370/208 |
| 7,382,718 | B2* | 6/2008 | Chang et al. | 370/204 |
| 8,130,848 | B2* | 3/2012 | Song et al. | 375/260 |
| 2008/0123757 | A1* | 5/2008 | Ido | 375/260 |
| 2010/0074348 | A1* | 3/2010 | Xu | 375/260 |
| 2011/0069779 | A1* | 3/2011 | Novak et al. | 375/295 |

* cited by examiner

*Primary Examiner* — Daniel Washburn
*Assistant Examiner* — Eboni Hughes
(74) *Attorney, Agent, or Firm* — Novak Druce Connolly Bove + Quigg LLP

(57) ABSTRACT

A system and method is provided for estimating the channel in OFDM transmission with inter-carrier interference (ICI). A channel in a data subcarrier in a subchannel shared between pilot subcarriers and data subcarriers can be estimated by performing interpolation based on estimated channels in pilot subcarriers in the same OFDM symbol as the subcarrier, such as through spline interpolation. A second estimate of the channel in the subcarrier can be produced by averaging an estimate of the channel in a subcarrier in the subchannel in a previous OFDM symbol and an estimate of the channel in a subcarrier in the subchannel in a succeeding OFDM symbol. A third estimate of the channel in the subcarrier can be produced through a linear combination of the first estimate and the second estimate. The channel in data subcarriers can be estimated through a weighted sum of the channel in nearest subcarriers.

19 Claims, 18 Drawing Sheets

501 ● Pilot subcarriers in shared and continuous pilot subchannels
502 ○ Data subcarriers in shared subchannels

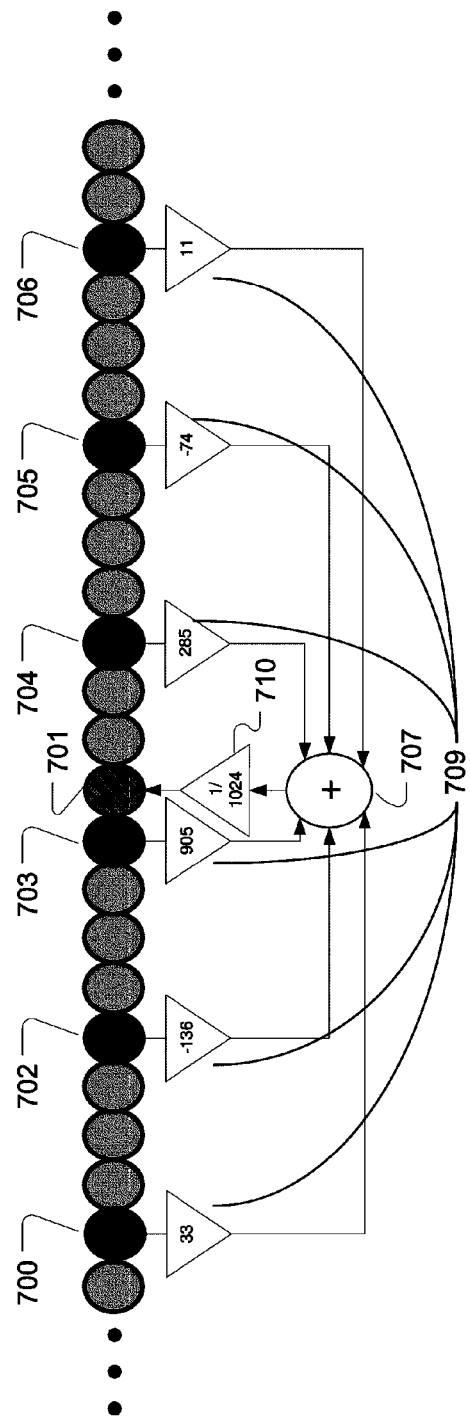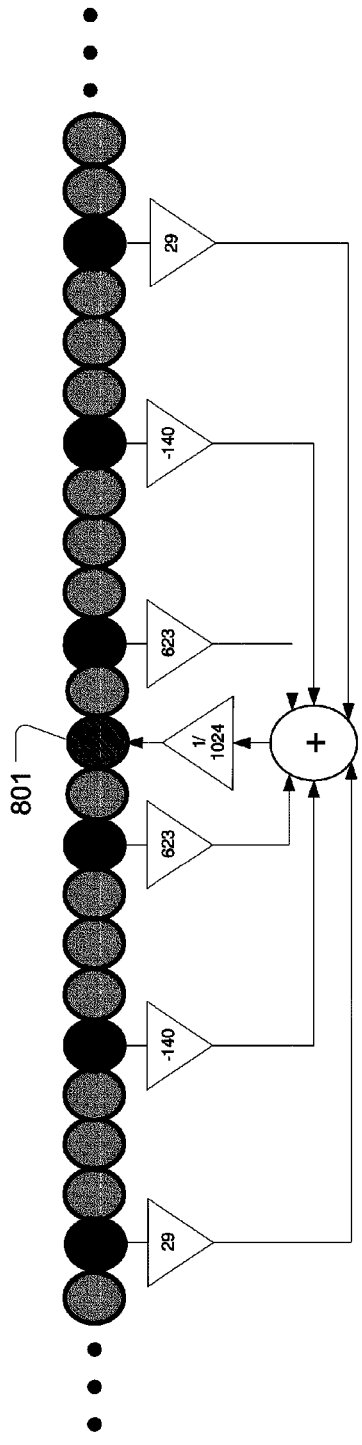

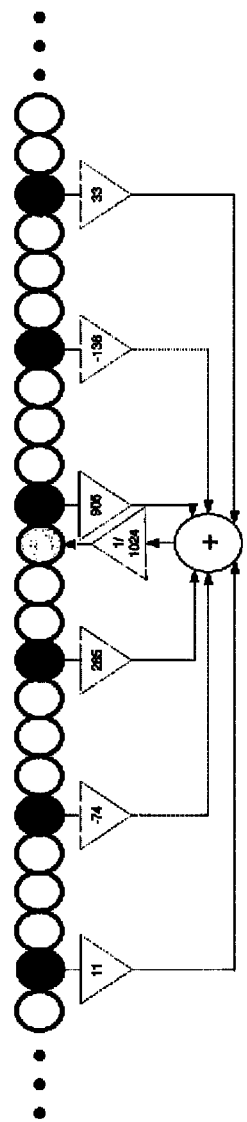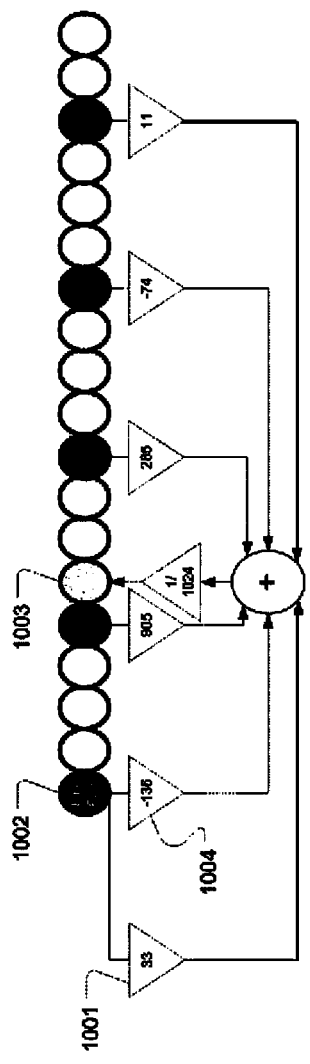
Figure 9
Figure 10

US 8,675,749 B2

CHANNEL ESTIMATION IN OFDM TRANSMISSION SYSTEM AND METHOD

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates generally to the field of wireless communication, and more specifically to channel estimation in Orthogonal Frequency-Division Multiplexing (OFDM) transmission.

BACKGROUND

In the age of information, the field of communications devices has experienced among the most rapid rates of innovation of any area of technology. As the requirements of communication devices continue to increase, methods for faster, cheaper, and more reliable data transfer are continuously developed. Orthogonal frequency-division multiplexing (OFDM) has developed as a method for reliable, high-volume data transfer in both wire and wireless mediums that can require simpler device architecture than other methods. Wideband digital applications such as digital television, audio broadcasting, wireless networking, and broadband internet have become popular applications for OFDM transmission.

Generally, in OFDM transmission, when the transmission channel is fixed in time and there is no Doppler effect, crosstalk between subchannels can be eliminated by selecting subcarrier frequencies so that subcarriers are orthogonal to each other. Hence, data sent through such OFDM transmission can be recovered from a received signal by estimating the channel in each subcarrier and compensating the signal for the estimated channel without taking into account inter-carrier interference (ICI).

However, in certain cases, such as when the Doppler Effect is present, subcarrier frequencies can become distorted. As a result, the subcarriers may no longer be orthogonal, resulting in cross-talk between subchannels and inter-carrier interference. In these situations, methods for data recovery that do not take into account inter-carrier interference can be insufficient to retrieve the transmitted data. What is needed is a system and method that estimates the channel taking into account inter-carrier interference so that channel equalization can compensate for inter-carrier interference based on the estimated channel.

BRIEF DESCRIPTION OF THE DRAWINGS

FIG. 7 illustrates an example calculation of a channel in a subcarrier in a shared subchannel to the right of a pilot subcarrier by spline interpolation that can be implemented in a filter, in accordance with various embodiments.

FIG. 8 illustrates an example calculation of a channel in a subcarrier in a shared subchannel between two successive shared subchannels by spline interpolation that can be implemented in a filter, in accordance with various embodiments.

FIG. 9 illustrates an example calculation of a channel in a subcarrier in a shared subchannel to the left of a pilot subcarrier by spline interpolation that can be implemented in a filter, in accordance with various embodiments.

FIG. 10 illustrates an example calculation of the channel in a subcarrier when a pilot subcarrier is missing, in accordance with various embodiments.

DETAILED DESCRIPTION

Figure 1:
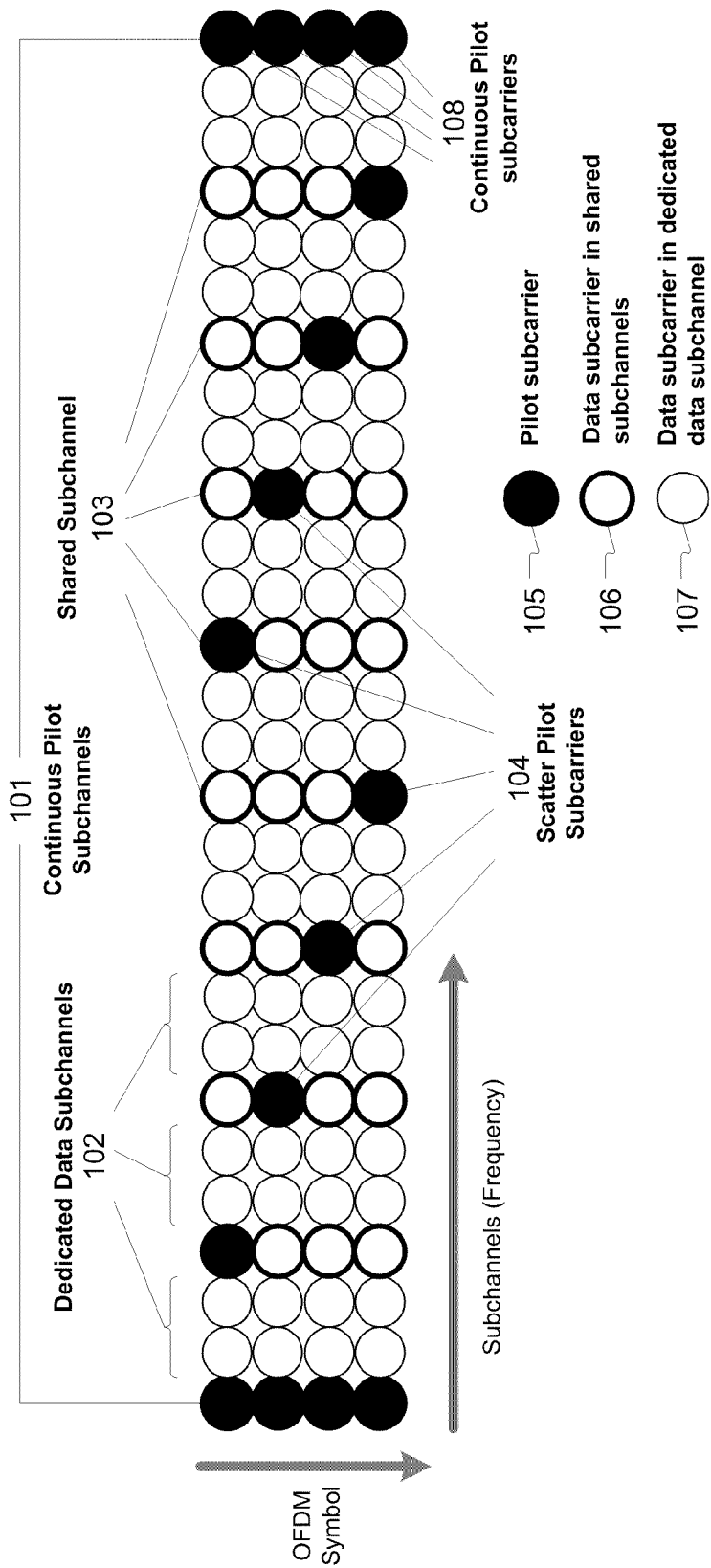
FIG. 1 illustrates an example of an OFDM signal with scatter pilots, which can be similar to signals in the DVB-T/H and ISDB-T standards.

In the following description, numerous specific details are set forth in order to provide a thorough understanding of the present invention. However, it will be apparent to one skilled in the art that the present invention can be practiced without these specific details. In other instances, well known circuits, components, algorithms, and processes have not been shown in detail or have been illustrated in schematic or block diagram form in order not to obscure the present invention in unnecessary detail. Additionally, for the most part, details concerning communication systems, transmitters, receivers, communication devices, computers, and the like have been omitted inasmuch as such details are not considered necessary to obtain a complete understanding of the present invention and are considered to be within the understanding of persons of ordinary skill in the relevant art. It is further noted that, where feasible, all functions described herein may be performed in either hardware, software, firmware, analog components or a combination thereof, unless indicated otherwise. Certain term are used throughout the following description and claims to refer to particular system components. As one skilled in the art will appreciate, components may be referred to by different names. This document does not intend to distinguish between components that differ in name, but not function. In the following discussion and in the Claims, the terms "including" and "comprising" are used in an open-ended fashion, and thus should be interpreted to mean "including, but not limited to . . . "

Embodiments of the present invention are described herein. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with applications and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In various embodiments, systems and methods are described for estimating a channel in OFDM transmission containing scatter pilot signals. Generally, OFDM signals can be sent over a wire medium, such as cabling, or wireless medium, such as air. When the signal travels through a medium, it may become affected by the medium. The effect can be referred to as the "channel." By estimating the channel and applying an inverse function of the channel to a received signal, an original transmitted signal can be recovered from an affected received signal; in other words, the transmitted data can be equalized.

FIG. 1 illustrates an example of an OFDM signal with scatter pilots, which can be similar to signals in the DVB-T/H and ISDB-T standards. Each horizontal row of circles represents an OFDM symbol. Each vertical row of circles represents a subchannel. Each circle in the figure is a subcarrier, which is a subchannel of an OFDM symbol. The frequency of the subchannels can increase from left to right. Subchannels that contain only pilot subcarriers 105 are continuous pilot subchannels 101 and pilot subcarriers in continuous pilot subchannels 101 are continuous pilot subcarriers 108. Subchannels that contain pilot subcarriers 105 and data subcarriers 106 are shared subchannels 103. Data subcarriers in shared subchannels 106 are represented by white circles with a bold outline in FIG. 1. Scatter pilot subcarriers 104 are pilot subcarriers 105 in shared subchannels 103. Dedicated data subchannels 102 contain only data subcarriers 107, represented by white circles with non-bold outline in the figure.

FIG. 1 illustrates a general example of an OFDM signal. Various types of OFDM signals in various standards may contain different numbers and configurations of pilot subcarriers, data subcarriers, dedicated data subchannels, shared subchannels, continuous pilot subchannels and other components than illustrated in FIG. 1. As one skilled in the art would appreciate, this disclosure is not limited to any particular configuration or type of OFDM signal.

In various embodiments, Channel Estimation can be performed to measure the channel in an OFDM transmission. The channel in an OFDM transmission can be estimated by estimating the channel in the subcarriers. Namely, each transmitted subcarrier can be affected by the environment and the medium through which the signal travels when the signal is transmitted. The channel in each subcarrier is effect that such transmission has had on the data in the subcarrier. In various embodiments, the channels in subcarriers in an OFDM signal can be estimated based on pilot subcarriers. The channel in pilot subcarriers can be estimated at the receiver based on a measured subcarrier value and an expected, known subcarrier value. The channel in the remaining, non-pilot subcarriers can be estimated based on the estimated channel in pilot subcarriers. Thus, the channel can be estimated in every subcarrier of every OFDM symbol. Once the channel is estimated, Channel Equalization can be performed to compensate the data signals for the channel to recover original transmitted data.

Figure 2:
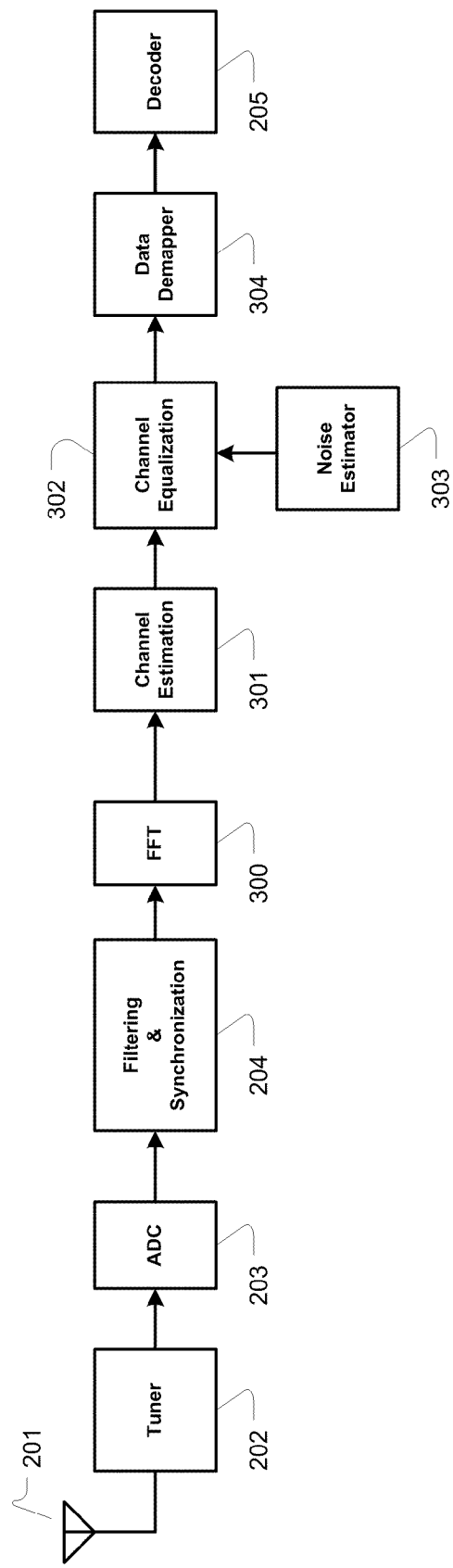
FIG. 2 illustrates an example of an OFDM receiver with a Channel Estimation and a Channel Equalization module, in accordance with various embodiments.

FIG. 2 illustrates an example of an OFDM receiver with a Channel Estimation and a Channel Equalization module, in accordance with various embodiments. A signal can be received through an antenna 201. The signal can be conveyed to a tuner 202, where the signal can be amplified, filtered, and/or down-converted, for example to a baseband or intermediate frequency (IF). After the tuner 202, the signal can be conveyed to an Analog to Digital Converter (ADC) 203 for analog to digital conversion. The signal can then be conveyed to a filtering and synchronization module 204 for further filtering and synchronization and then to a Fast Fourier Transform (FFT) module 300. The FFT module 300 can output OFDM symbols. The OFDM symbols can be conveyed to a Channel Estimation module 301, where the channel can be estimated based on the pilot signals. OFDM symbols, the estimated channel, as well as noise power data from a Noise Estimator module 303 can be conveyed to the Channel Equalization module 302, where equalized data values can be produced. The equalized data values can then be conveyed to a Data Demapper 304 and to a Decoder 205 for further processing.

Figure 3:
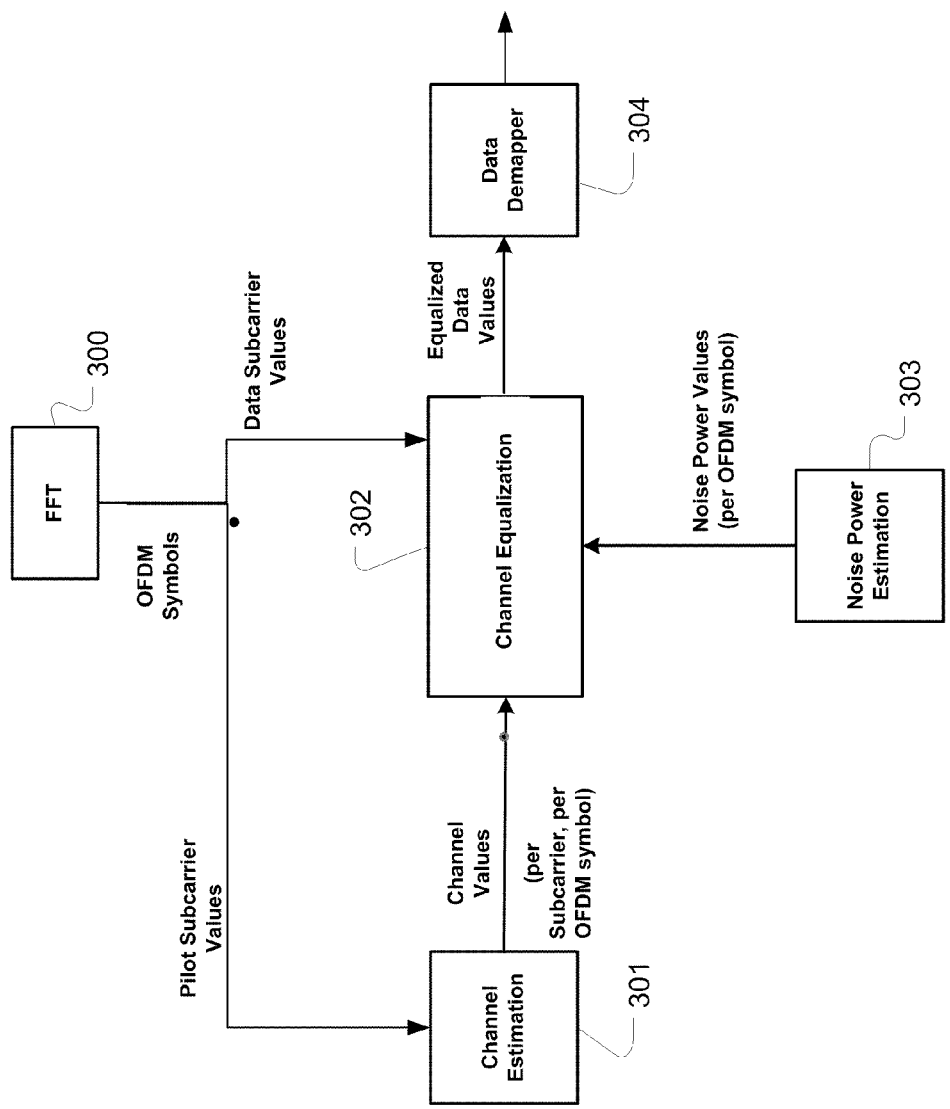
FIG. 3 illustrates an example of a Channel Estimation and a Channel Equalization module, in accordance with various embodiments.

FIG. 3 illustrates an example of a Channel Estimation and a Channel Equalization module, in accordance with various embodiments. OFDM symbols can be conveyed from the FFT module 300. Pilot subcarrier values can be conveyed to the Channel Estimation module 301 and data subcarrier values can be conveyed to the Channel Equalization module 302. In the Channel Estimation module 301, the channel in subcarriers can be estimated based on the pilot subcarrier values, as will be described in greater detail below. In various embodiments, a channel in every subcarrier, in every OFDM symbol can be estimated. The estimated channel values from the channel estimation module 301, data subcarrier values from the FFT module 300, and noise power data per OFDM symbol from a noise power estimation module 303 can be conveyed to the Channel Equalization module 302. In the Channel Equalization module 302, data subcarrier values can be adjusted, or "equalized", based on the estimated channel in each subcarrier value and the noise power data. The equalized data values can be conveyed to a Data Demapper 304 for further processing.

Generally, the channel in a pilot subcarrier can be estimated directly based on the expected value of the pilot subcarrier and the measured value of the pilot subcarrier. For example, the channel in a pilot subcarrier can be estimated by dividing the measured value of the subcarrier by the expected value of the subcarrier. The channel in data subcarriers in dedicated data subchannels and shared subchannels cannot be estimated directly, as it can be in pilot subcarriers, because the expected value in those subcarriers is not known at the receiver. However, in data subcarriers, the channel can be estimated based on the estimated channel in nearby pilot subcarriers.

Figure 4:
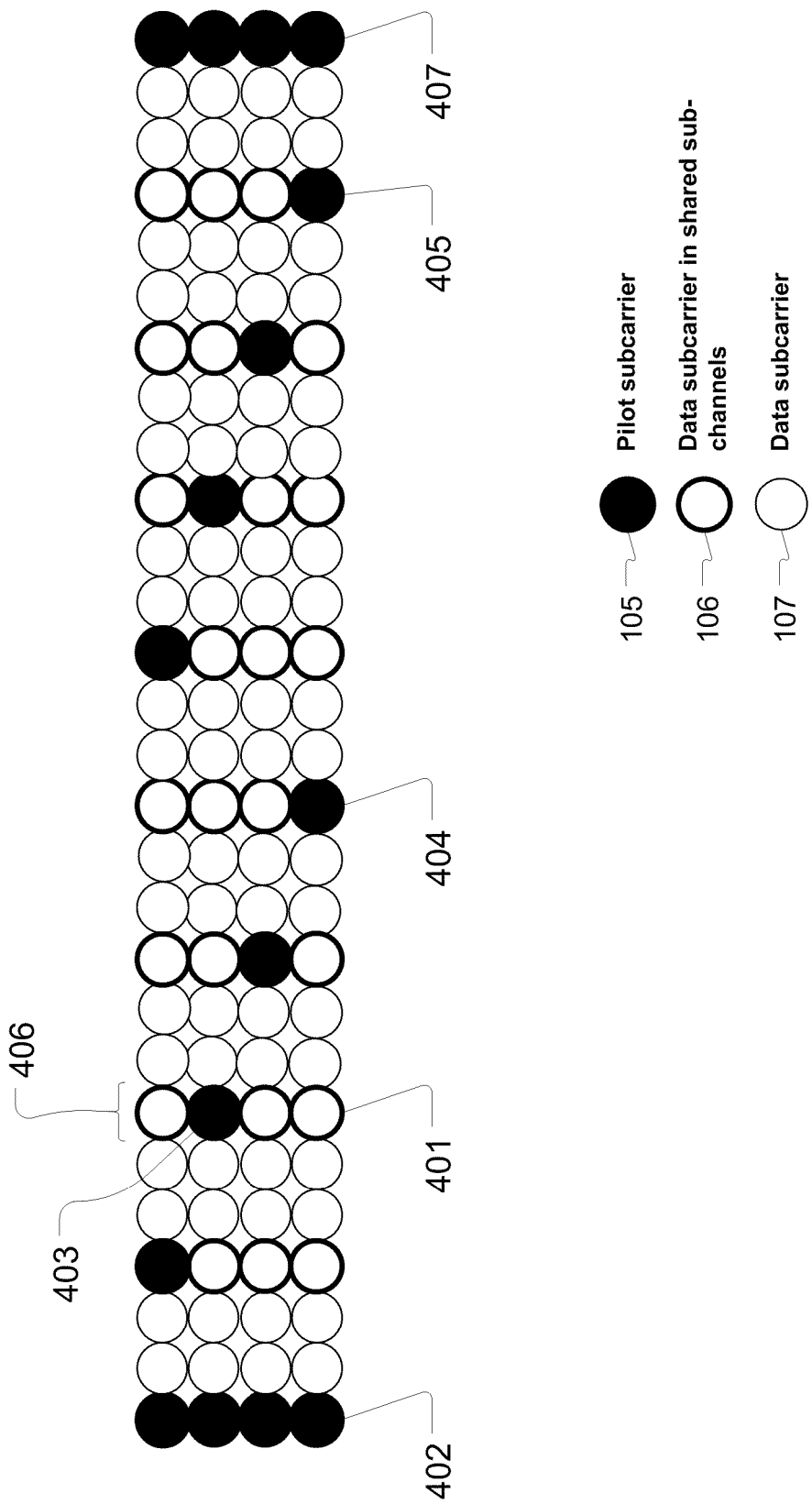
FIG. 4 illustrates an example of channel estimation in an OFDM transmission.

FIG. 4 illustrates an example of channel estimation in an OFDM transmission, in accordance with various embodiments. In a transmission with a time-invariant channel; that is, where the channel substantially does not change over time, the channel in each subcarrier of a subchannel will be constant. However, the channel may differ across different channels. For instance, in the illustrated example, if the channel in the transmission is time invariant, then the channel in the subchannel 406 will be constant, in other words, the channel in each subcarrier of the subchannel 406 will be substantially the same. Hence, the channel in each of the four illustrated subcarriers of the subchannel will be approximately the same. In such a scenario, the channel in the pilot subcarrier 403 can be an accurate estimate of the channel in the data subcarrier 401. Hence, in a time invariant channel, an estimate of a channel in a pilot subcarrier can be used to estimate the channel in another data subcarrier in the same subchannel.

However, if the channel in a transmission is time-variant, then the channel in a subchannel can change from one OFDM symbol to the next. For example, this can be the case when the Doppler Effect is present. In such cases, the estimated channel in a pilot subcarrier in a subchannel, such as the pilot subcarrier 403 in FIG. 4, may provide a poor estimate of the channel in another data subcarrier in the subchannel, such as the data subcarrier 401. However, because adjacent parts of each symbol can be received near in time to each other, time-variant effects can be substantially consistent throughout a symbol or portions of a symbol. In this case, estimated channels in pilot subcarriers in an OFDM symbol can be used to produce an estimate of the channel in a data subcarrier in the OFDM symbol. Therefore, when the channel is time-variant, the channel in a subcarrier can be estimated based on the channel in neighboring subcarriers, such as the channel in neighboring pilot subcarriers. For example, an estimate of the channel in any of the pilot subcarriers 402, 404, 405, and 407 in the OFDM symbol in FIG. 4 can be used to produce an estimate of the channel in the data subcarrier 401. Furthermore, in various embodiments, a channel in a subcarrier can be estimated based on both an estimated channel or channels in pilot subcarriers in the same subchannel as the subcarrier but in different OFDM symbol(s) and an estimated channel or channels in pilot subcarriers in the same OFDM symbol as the subcarrier.

In various embodiments, the channel in data subcarriers in shared subcarriers of an OFDM symbol 106 can be estimated using interpolation methods based on estimated channels in continuous 108 and scatter pilot subcarriers 104 in the same OFDM symbol. Linear interpolation can be used to estimate the channel in the data subcarriers in shared subchannels 106. In an embodiment, Spline interpolation can be used to estimate the channel in such data subcarriers 106. An interpolation function, such as Spline interpolation, can be implemented as a filter to estimate the channel.

Figure 5:
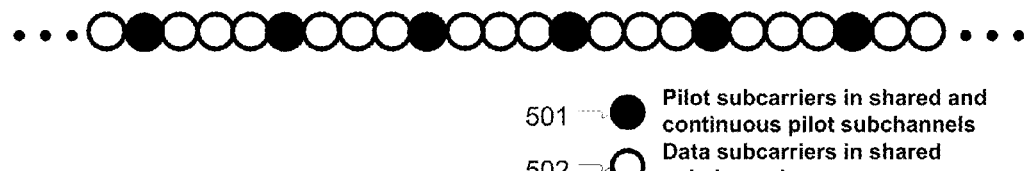
FIG. 5 illustrates an example of an OFDM symbol with dedicated data subcarriers omitted for the sake of illustration.

FIG. 5 illustrates an example of an OFDM symbol with dedicated data subcarriers omitted for the sake of illustration. In the illustrated example, the black circles can represent pilot subcarriers in shared and/or continuous pilot subchannels 501. The channel in the pilot subcarriers can be estimated based on expected values, for example by dividing the measure value of the subcarrier by the expected value of the subcarrier. In the illustrated example, the white circles can represent data subcarriers in shared subchannels 502. The channel in the data signals 502 can be estimated using methods of interpolation based on the estimated channels in pilot signals 501.

Figure 6:
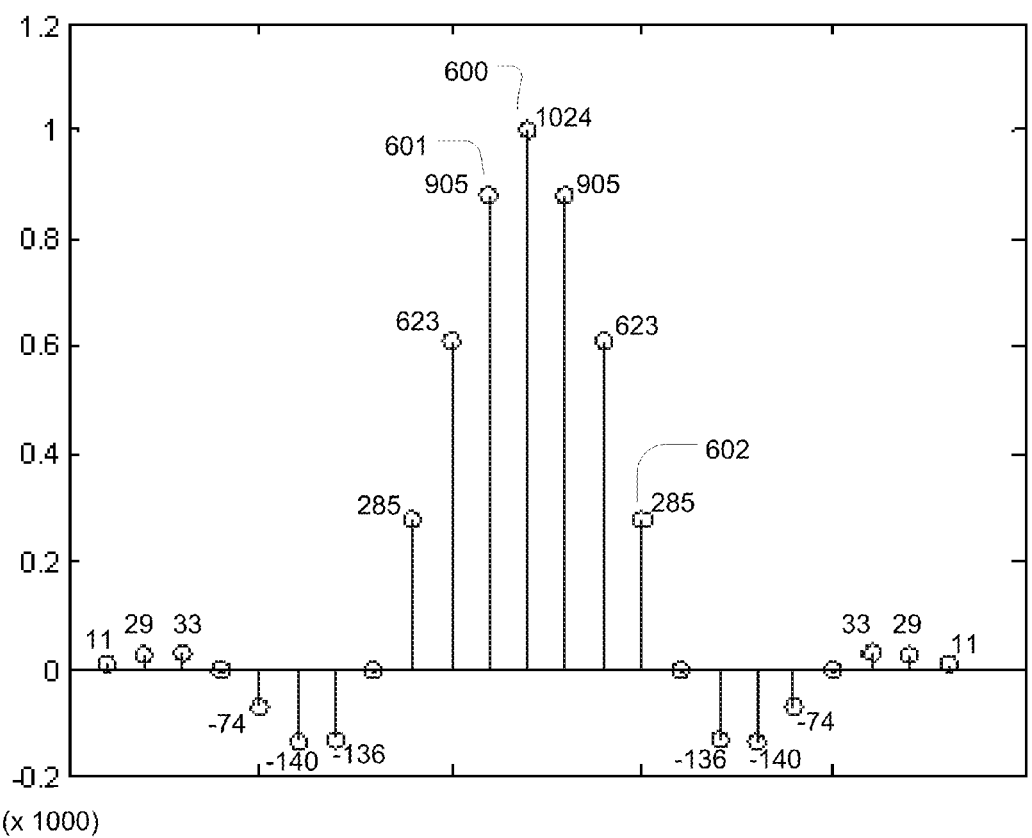
FIG. 6 illustrates a graphical example of the impulse response of a filter that can be implemented to perform interpolation, in accordance with various embodiments.
Figure 11:
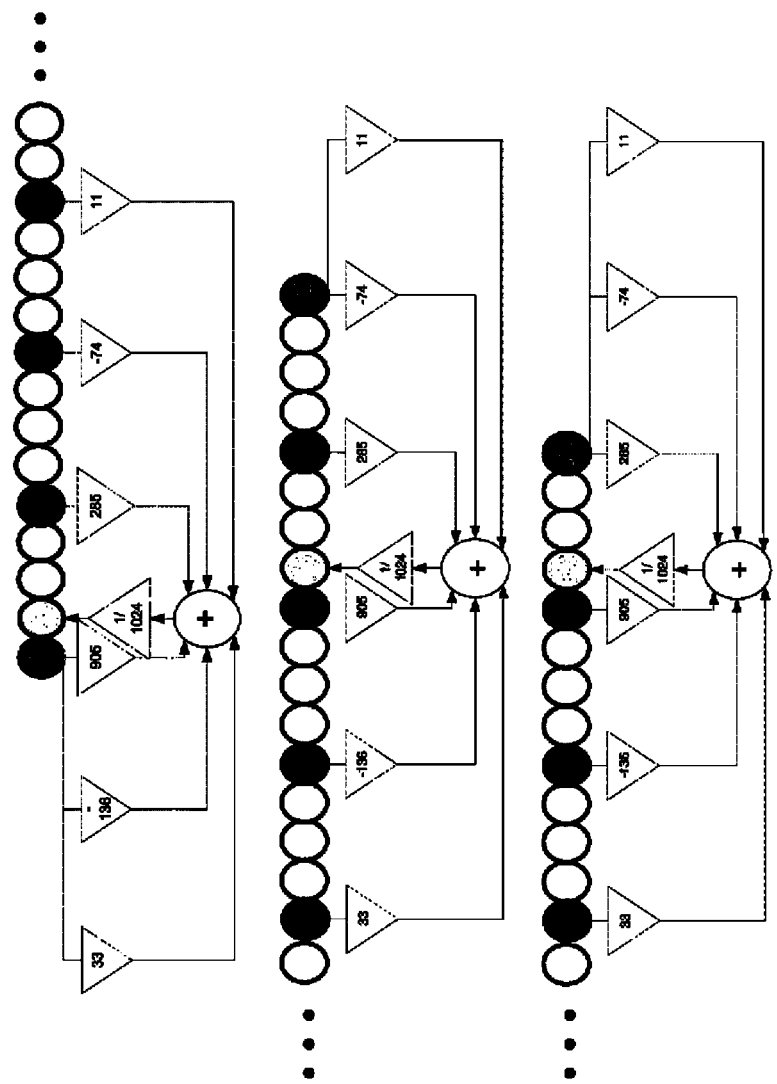
FIG. 11 illustrates further examples of channel estimation with missing pilot subcarriers, in accordance with various embodiments.
Figure 12:
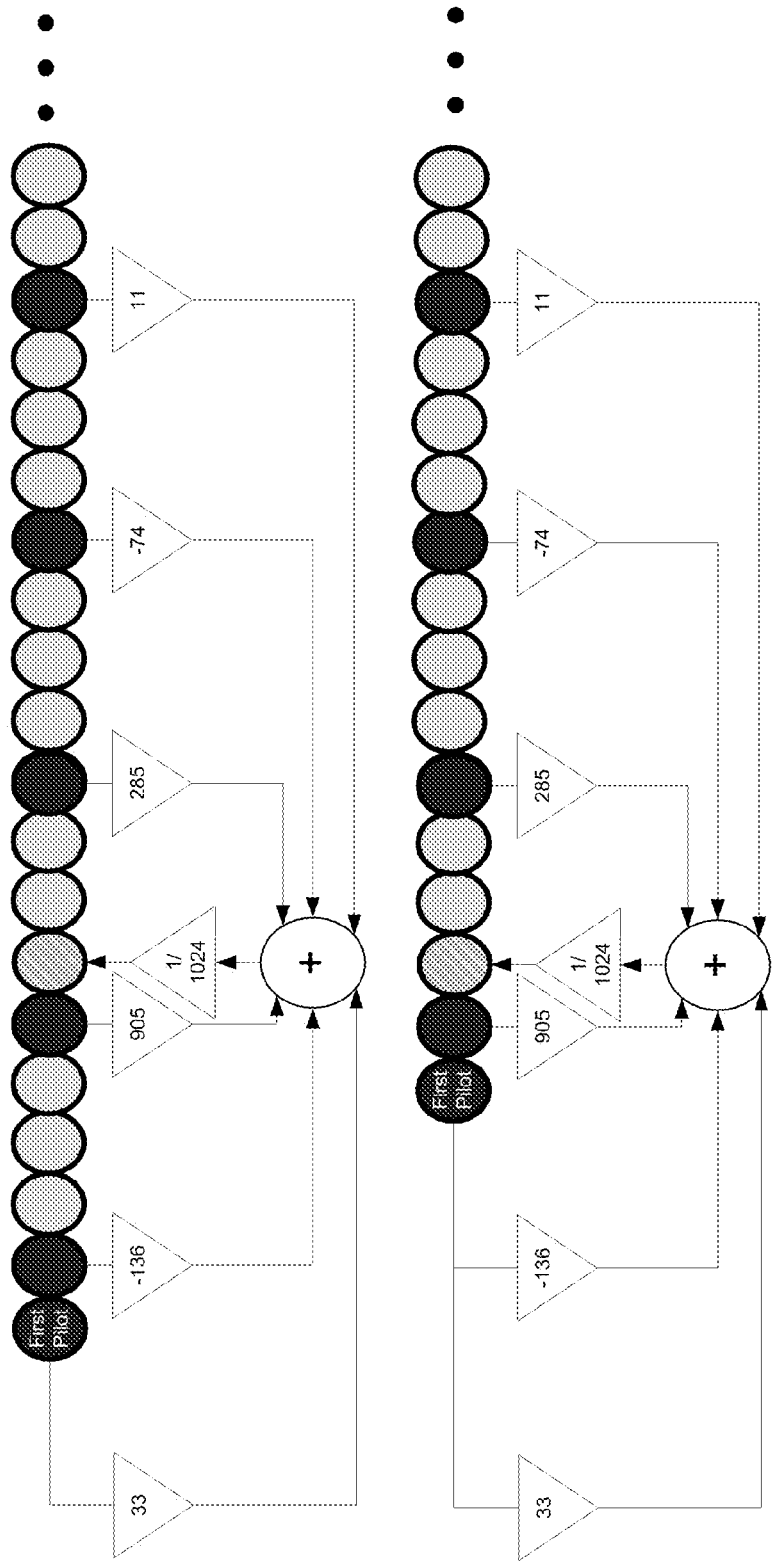
FIG. 12 illustrates further examples of channel estimation with missing pilot subcarriers, in accordance with various embodiments.
Figure 13:
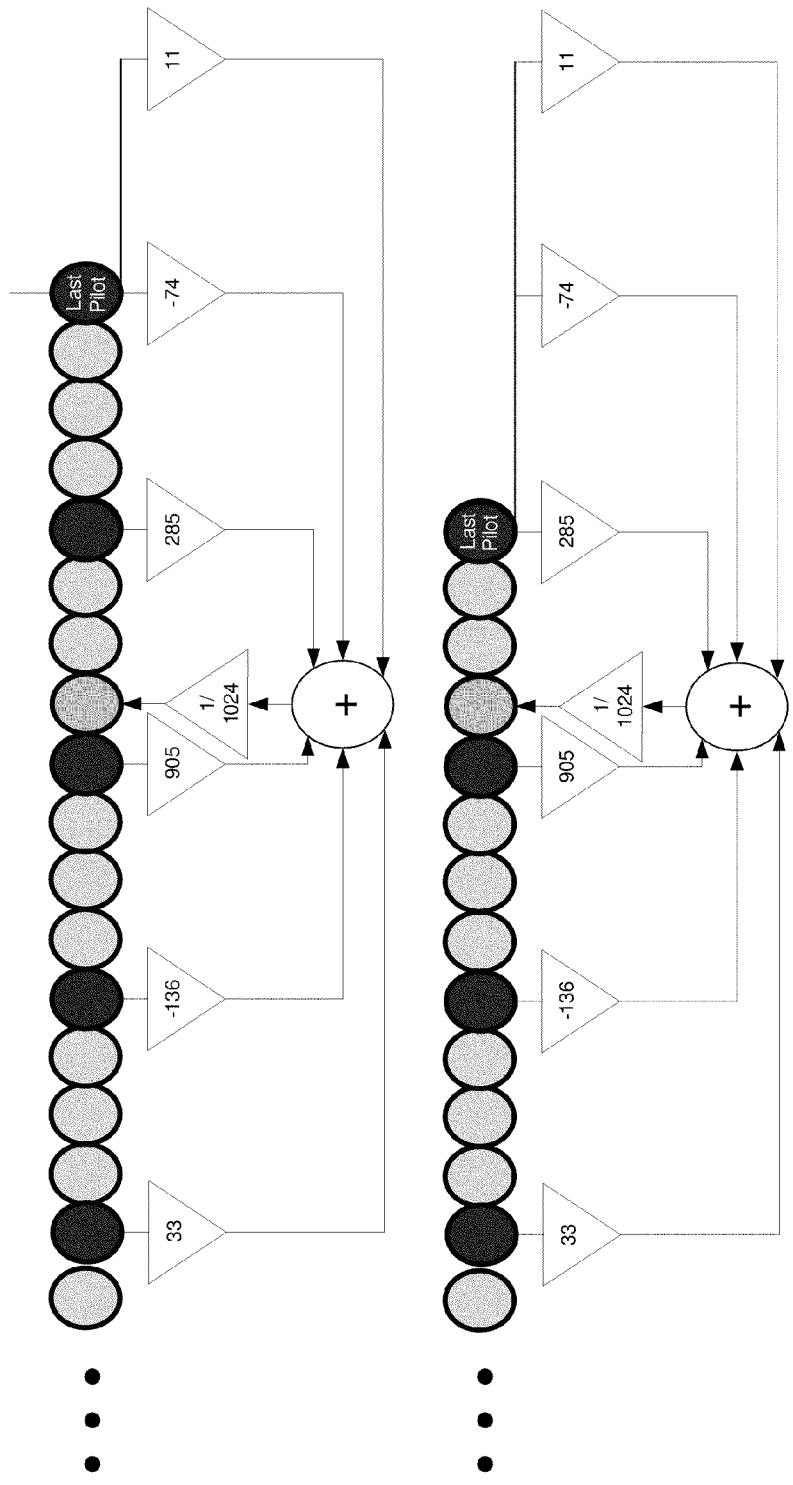
FIG. 13 illustrates further examples of channel estimation with missing pilot subcarriers, in accordance with various embodiments.
Figure 14:
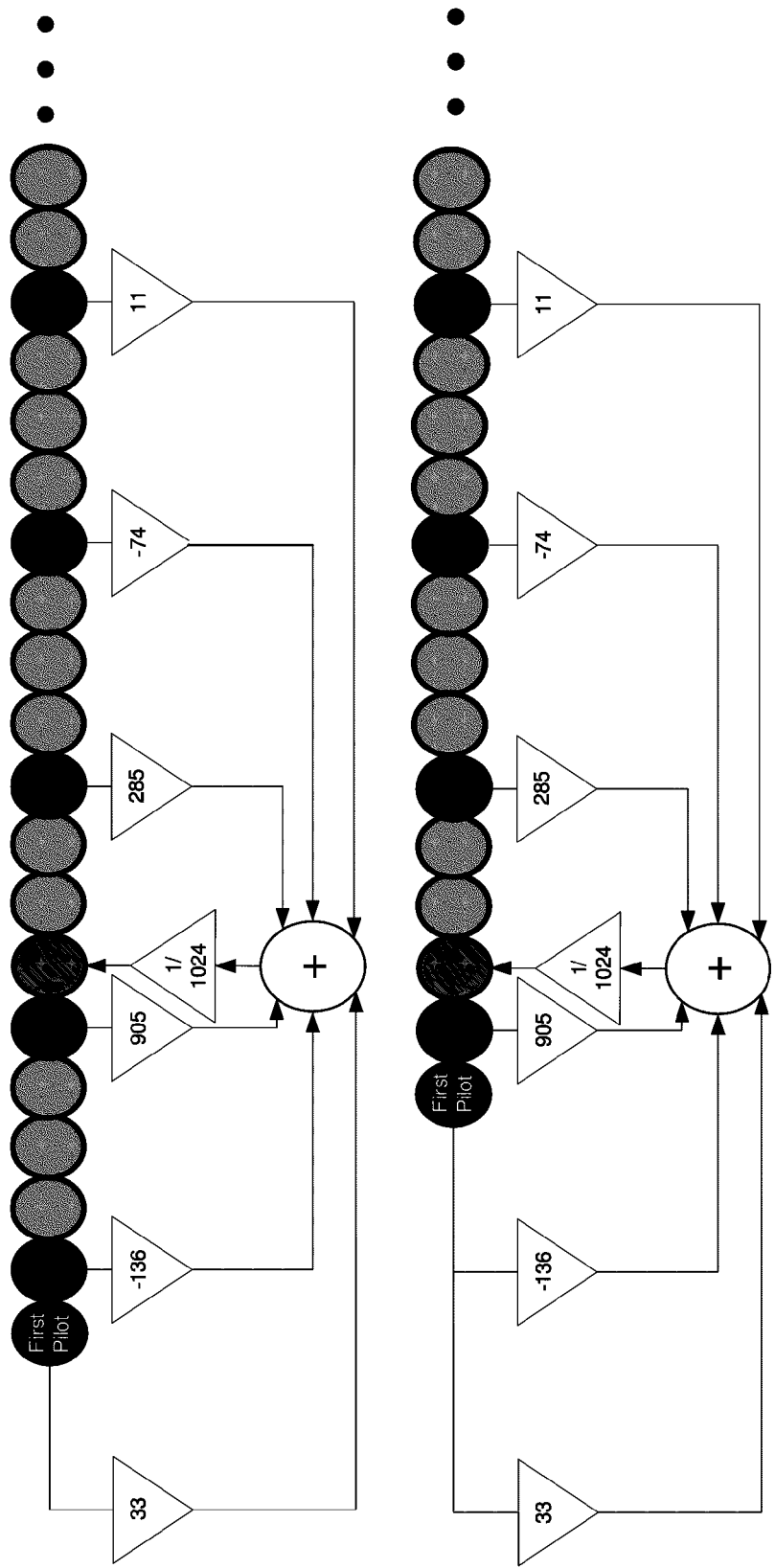
FIG. 14 illustrates further examples of channel estimation with missing pilot subcarriers, in accordance with various embodiments.
Figure 15:
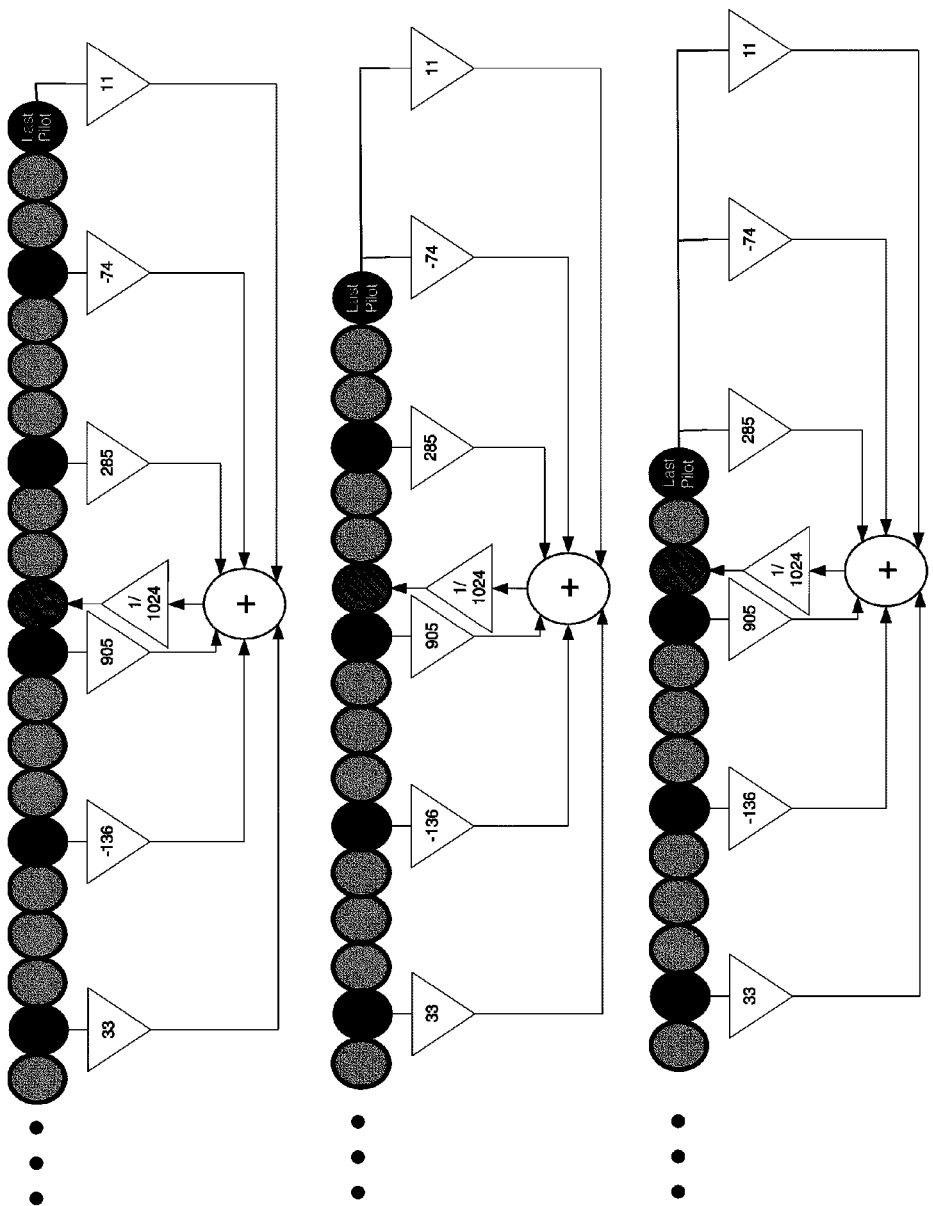
FIG. 15 illustrates further examples of channel estimation with missing pilot subcarriers, in accordance with various embodiments.
Figure 16:
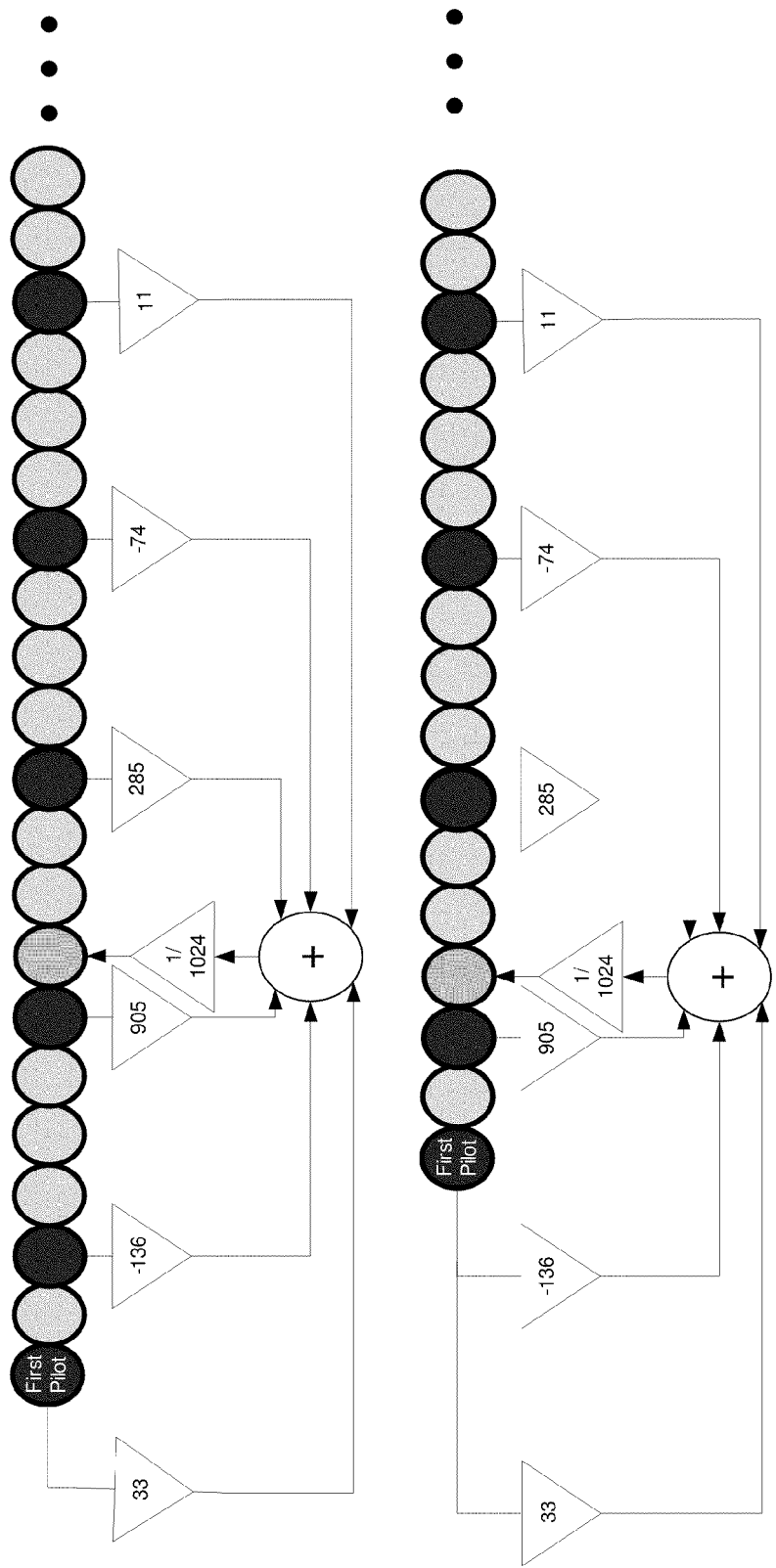
FIG. 16 illustrates further examples of channel estimation with missing pilot subcarriers, in accordance with various embodiments.
Figure 17:
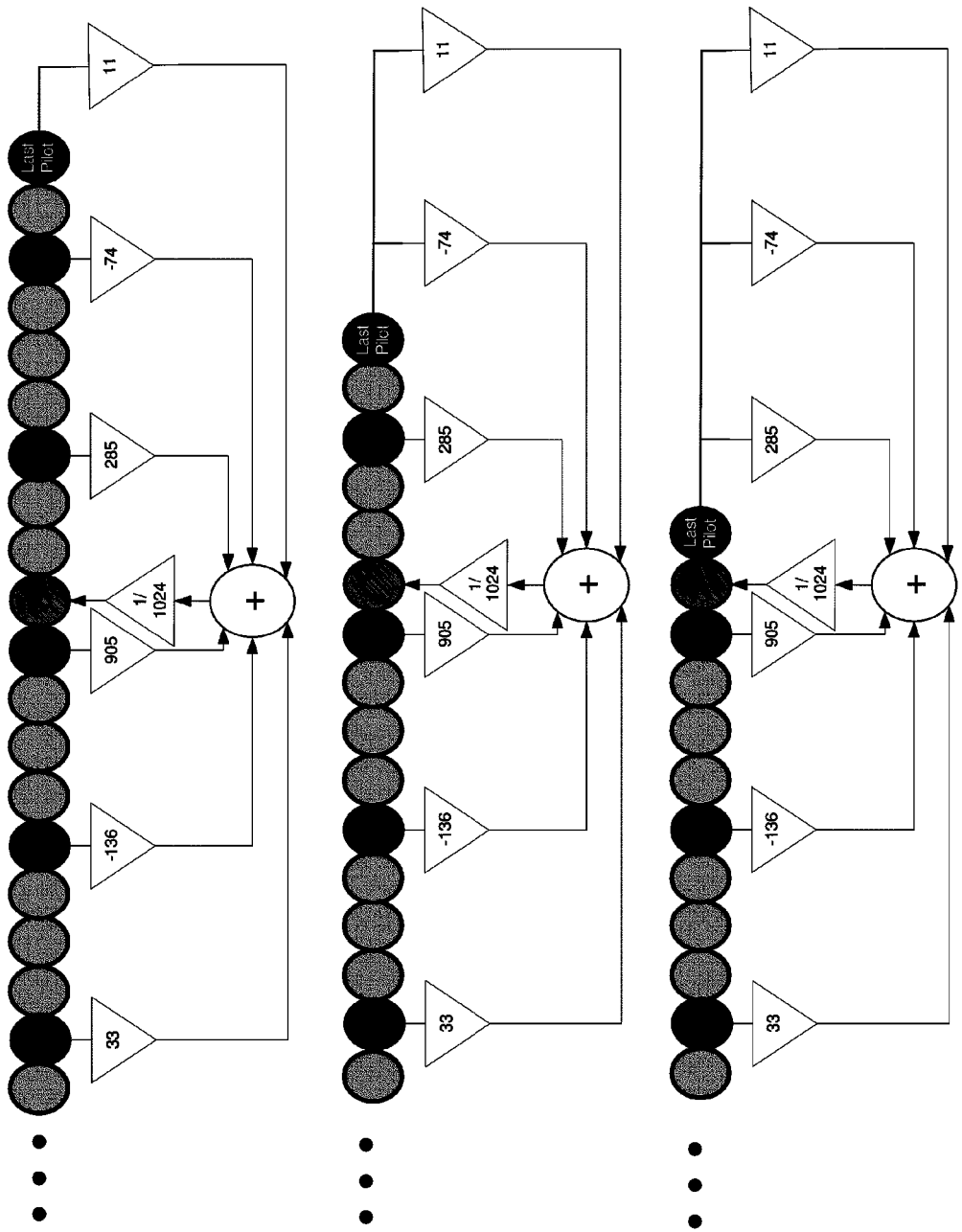
FIG. 17 illustrates further examples of channel estimation with missing pilot subcarriers, in accordance with various embodiments.
Figure 18:
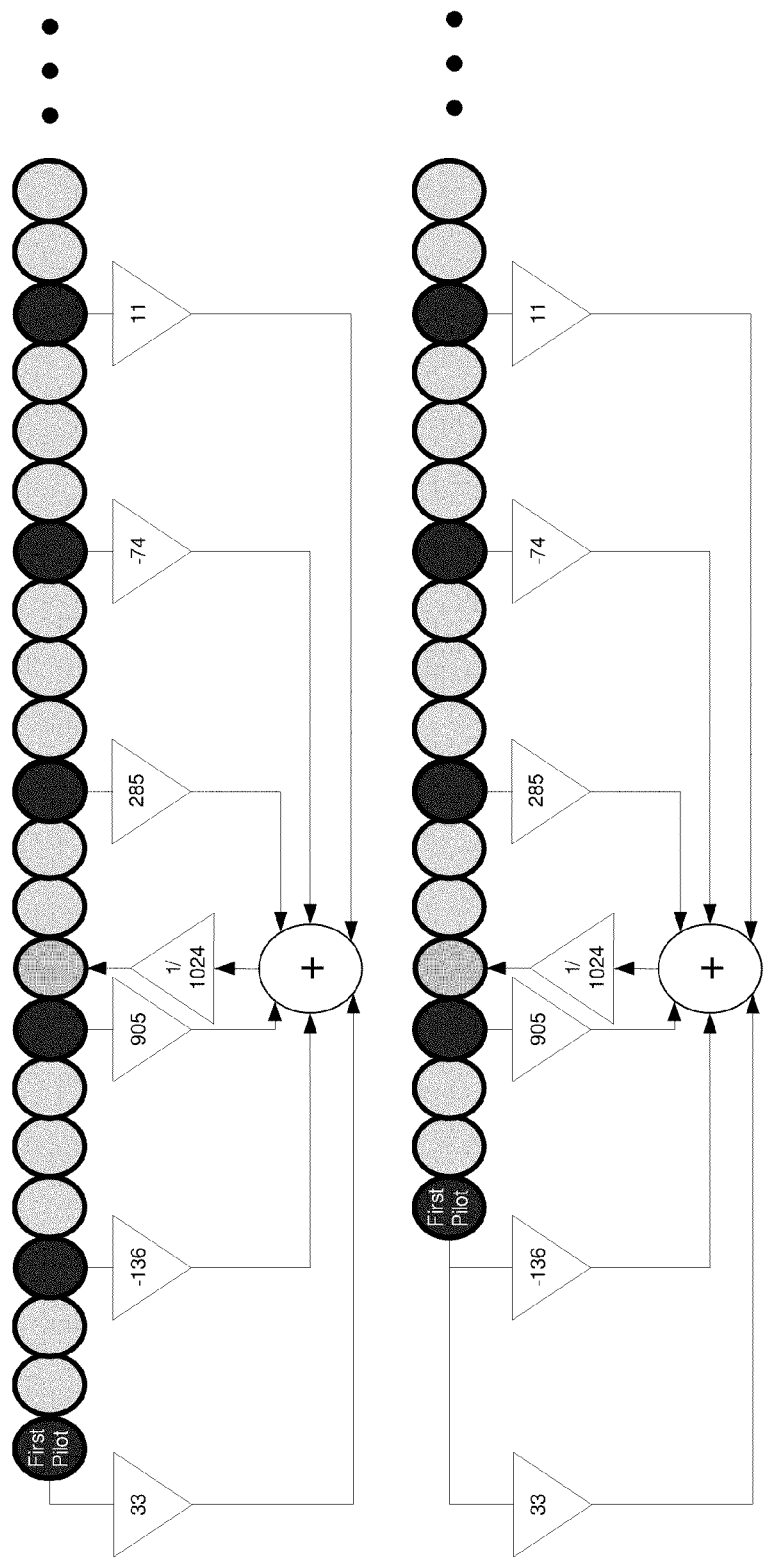
FIG. 18 illustrates further examples of channel estimation with missing pilot subcarriers, in accordance with various embodiments.
Figure 19:
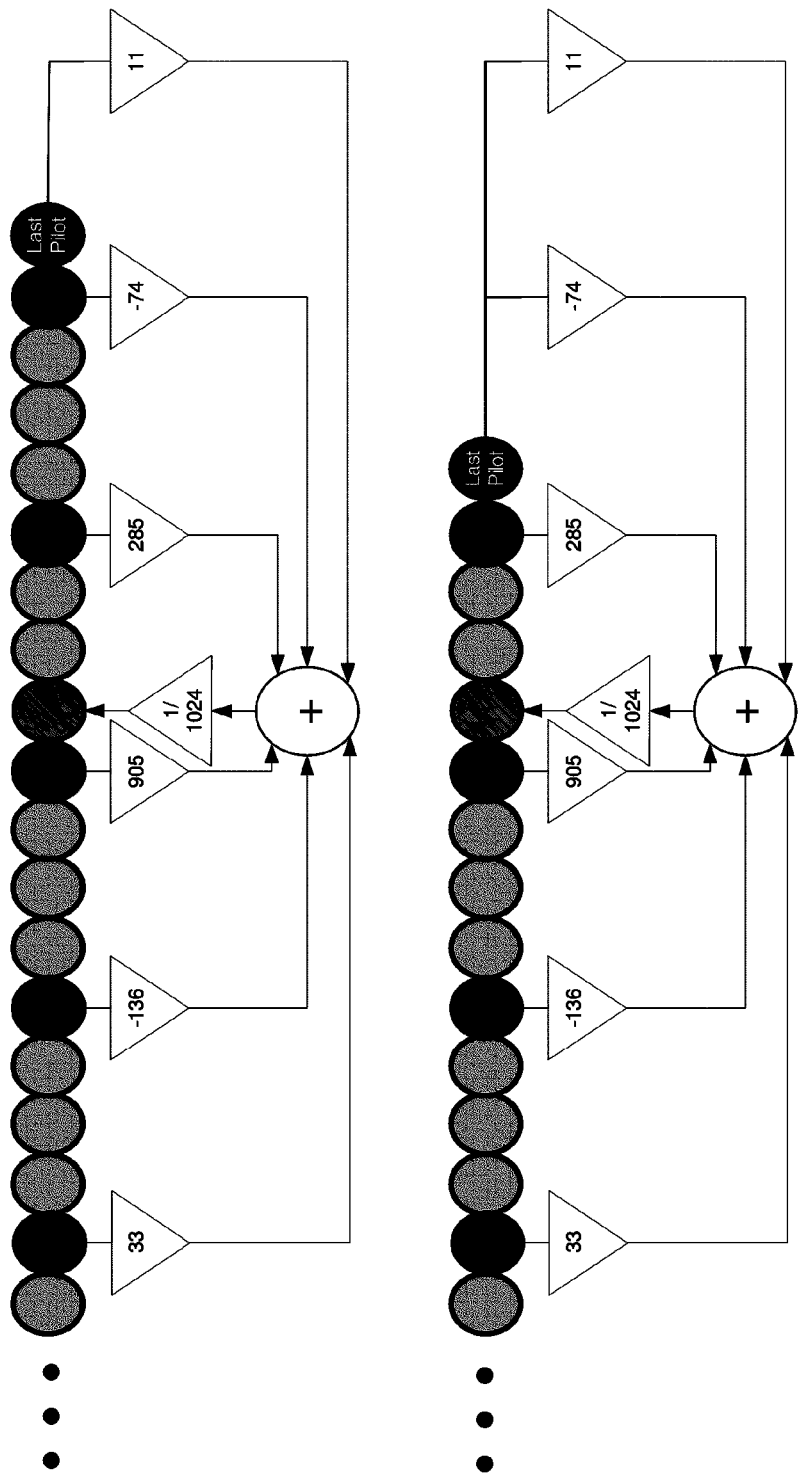
FIG. 19 illustrates further examples of channel estimation with missing pilot subcarriers, in accordance with various embodiments.

Interpolation can be implemented through a filter with a desired impulse response. In an embodiment, spline interpolation can be implemented through a filter. FIG. 6 illustrates a graphical example of the impulse response of a filter that can be implemented to perform interpolation. Such a filter can be implemented to estimate the channel in a data subcarrier 502 of an OFDM symbol such as illustrated in FIG. 5. The channel in pilot subcarriers 501 can be estimated based on the expected and measured values, as described, and the channel can be transferred to an output without change in the filter. Each peak in the graph can correspond to a data subcarrier in a shared subchannel 502, such as the subcarriers illustrated in FIG. 5. The height of each peak, measured on the Y-axis, can correspond to the weight that can be attributed to a corresponding subcarrier value by the filter, as will be illustrated further below.

FIG. 7 illustrates an example calculation of a channel in a subcarrier in a shared subchannel to the right of a pilot subcarrier by spline interpolation that can be implemented in a filter, in accordance with various embodiments. In the OFDM symbol of the illustrated figure, the pure data subcarriers were omitted, as was illustrated in FIG. 5, for the sake of illustration. Hence, in the illustrated example, the black circles can represent pilot subcarriers in shared and/or continuous pilot subchannels 501 and the white circles can represent data subcarriers in shared subchannels 502. As illustrated in the figure, the channel in a subcarrier 701 to the right of a pilot subcarrier 703 can be estimated based on the estimated channel in pilot subcarriers 700, 702, 703, 704, 705, and 706 in the OFDM symbol. The channel in the pilot subcarriers can be estimated based on the expected pilot values and the measured pilot values. The estimated channel in each pilot subcarrier can be multiplied by a corresponding weight 709, the products can then be added in an adder 707, and the sum can be divided by a total weight 710. The weights can be applied according to the impulse response as illustrated in FIG. 6. Namely, the pilot subcarrier 703 to the left of the subcarrier 701 can be multiplied by the weight corresponding to the peak 601 to the left of the center peak 600 in the graph of FIG. 6, or 905. The pilot subcarrier three carriers to the right 704 of the subcarrier 701 can be multiplied by the weight corresponding to the peak 602 three peaks to the right of the center peak 600 in the graph of FIG. 6, or 285. The weights can be similarly assigned to the other pilot subcarriers 700, 702, 705, and 706.

The spline interpolation can be implemented for other data subcarriers in shared subchannels in an OFDM symbol by implementing the same methodology as illustrated in FIG. 7.

FIG. 8 illustrates an example calculation of a channel in a subcarrier in a shared subchannel between two successive shared subchannels by spline interpolation that can be implemented in a filter, in accordance with various embodiments. In the example illustrated in the FIG. 8, the methodology illustrated in FIG. 7 can be implemented to estimate the channel in a subcarrier 801 between two data subcarriers. The estimated channels in pilot subcarriers can be multiplied by corresponding weights assigned by the spline interpolation method, the products can be added, and the sum can be divided by a total weight as was illustrated in FIG. 7. The weights can be chosen according to the distribution illustrated in FIG. 6, according to the same methodology as was described in FIG. 7.

FIG. 9 illustrates an example calculation of a channel in a subcarrier in a shared subchannel to the left of a pilot subcarrier by spline interpolation that can be implemented in a filter, in accordance with various embodiments.

If a pilot subcarrier that is supposed to be used in an estimate is missing, for example, when a channel in a subcarrier near the edge of an OFDM symbol is estimated, the weight of the missing pilot subcarrier can be applied to the closest existing pilot subcarrier. FIG. 10 illustrates an example calculation of the channel in a subcarrier when a pilot subcarrier is missing, in accordance with various embodiments. As illustrated in the example, because the subcarrier corresponding to the "33 weight" 1001 is missing, the estimated channel in the first pilot subcarrier 1002 can be used instead of the missing subcarrier. Hence, the estimated channel in the first pilot subcarrier 1002 can be used twice in the calculation of the channel in the subcarrier 1003, once with the "33 weight" and once with the "−136 weight" 1004.

Similarly, if two or more pilot subcarrier values are missing, then the weight of the missing pilot subcarriers can be applied to the closest existing pilot subcarrier. FIGS. 11 through 19 illustrate further examples of channel estimation with missing pilot subcarriers, in accordance with various embodiments.

The above examples illustrate channel estimation implementing spline interpolation with provided weights. It will be apparent to one of reasonable skill in the art that channel estimation can be performed using different methods of interpolation and/or different weights than the described examples without departing from the spirit of the invention. For example, a filter can be implemented to estimate a channel in a subcarrier through linear interpolation, through spline interpolation with different parameters than described above, through interpolation with weights that are selected manually, and through other methods.

Figure 20A:
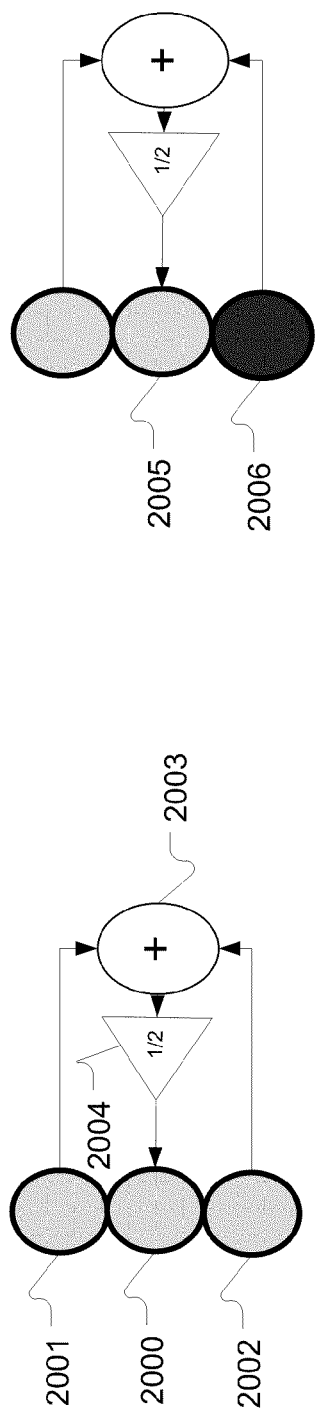
FIG. 20A illustrates an example estimation of a channel in a data subcarrier in a shared subchannel based on an estimate of the channel in a subcarrier in the subchannel of the previous OFDM symbol and an estimate of the channel in the subcarrier in the subchannel of the next OFDM symbol, in accordance with various embodiments.

FIG. 20A illustrates an example estimation of a channel in a data subcarrier in a shared subchannel based on an estimate of the channel in a subcarrier in the subchannel of the previous OFDM symbol and an estimate of the channel in the subcarrier in the subchannel of the next OFDM symbol, in accordance with various embodiments. As illustrated in the example of the figure, the channel in a data subcarrier 2000 can be estimated based on the subcarrier 2001 in the subchannel of the previous OFDM symbol and the subcarrier 2002 in the subchannel of the next OFDM symbol. The channel in the data subcarrier 2000 can be estimated by averaging the estimated channels in the previous subcarrier 2001 and the next subcarrier 2002 by adding the estimated channels 2001, 2002 in an adder 2003 and dividing the sum by 2 in a divider 2004. In various embodiments, different methods can be used to estimate the subcarrier 2000 based on the estimated channels in the previous subcarrier 2001 and the next subcarrier 2002. For example a linear combination of the estimated channels 2001, 2002 can be used to estimate the channel 2000 with more weight being placed on one estimated channel than the other, for example a weight of 0.4 can be placed on the channel estimate in the previous subcarrier 2001 and a weight of 0.6 can be placed on the channel estimate in the next subcarrier 2002. The estimate of the channel in subcarriers 2001 and 2002 can be performed based on pilot subcarriers. In various embodiments, the channel in the subcarriers 2001 and 2002 can be estimated according to methods described above, for example, through the spline interpolation method described above.

Figure 20B:
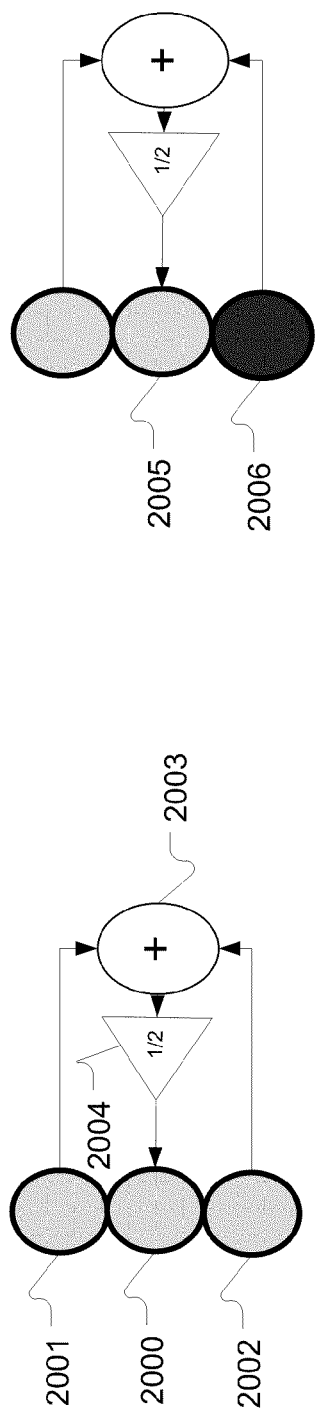
FIG. 20B illustrates an example estimation of a channel in a data subcarrier in a shared subchannel based on an estimate of the channel in a subcarrier in the subchannel of the previous OFDM symbol and an estimate of the channel in the subcarrier in the subchannel of the next OFDM symbol, when the subcarrier in the subchannel of the next OFDM symbol is a pilot subcarrier, in accordance with various embodiments.

FIG. 20B illustrates an example estimation of a channel in a data subcarrier in a shared subchannel based on an estimate of the channel in a subcarrier in the subchannel of the previous OFDM symbol and an estimate of channel in the subcarrier in the subchannel of the next OFDM symbol, when the subcarrier in the subchannel of the next OFDM symbol is a pilot subcarrier, in accordance with various embodiments. In such a case, an estimate of the channel 2005 can be performed as described above in FIG. 20A. The channel in the pilot subcarrier 2006 can be estimated based on the expected value of the subcarrier 2006 and the measured value of the subcarrier 2006, as described above.

Figure 20C:
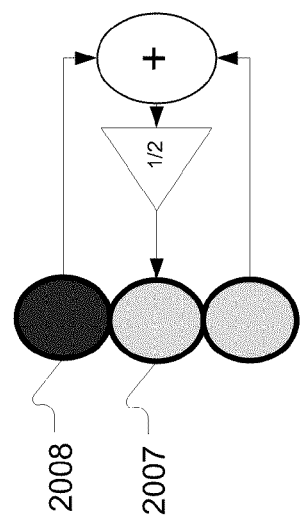
FIG. 20C illustrates an example estimation of a channel in a data subcarrier in a shared subchannel based on an estimate of a channel in a subcarrier in the subchannel of the previous OFDM symbol and an estimate of the channel in the subcarrier in the subchannel of the next OFDM symbol, when the subcarrier in the subchannel of the previous OFDM symbol is a pilot subcarrier, in accordance with various embodiments.

FIG. 20C illustrates an example estimation of a channel in a data subcarrier in a shared subchannel based on an estimate of a channel in a subcarrier in the subchannel of the previous OFDM symbol and an estimate of the channel in the subcarrier in the subchannel of the next OFDM symbol, when the subcarrier in the subchannel of the previous OFDM symbol is a pilot subcarrier, in accordance with various embodiments. In such a case, an estimate of the channel 2007 can be performed as described above in FIG. 20A. The channel in the pilot subcarrier 2008 can be estimated based on the expected value in the subcarrier 2008 and the measured value in the subcarrier 2008, as described above.

FIGS. 20A through 20B illustrate using subcarriers in the same subchannel of the immediately previous OFDM symbol and the immediately succeeding OFDM symbol to estimate the channel in a subcarrier. In various other embodiments, subcarriers in the same subchannel of other preceding and/or succeeding OFDM symbols can be used instead of or in addition to the immediately previous and immediately next OFDM symbols to estimate the channel in a subcarrier.

In various embodiments, a channel in a data subcarrier can be estimated by combining two different estimates of the channel in the data subcarrier. For example, an estimate of the channel in the subcarrier obtained based on pilot signals in the OFDM symbol, for example as illustrated above in FIGS. 7 through 19, can be combined with an estimate of the channel in the same subcarrier obtained based on an estimate of a subcarrier channel in the subchannel of the previous OFDM symbol and an estimate of the subcarrier channel in the subchannel of the next OFDM symbol, as illustrated in FIGS. 20A through 20C. In an embodiment, the two estimates can be combined in a linear combination with a coefficient of ½. For example, the first estimate can be multiplied by ½ and the second estimate can be multiplied by ½ and the two products can be added. In other embodiments, the multiples can be different to give more weight to one estimate that the other.

Thus, in an embodiment, a channel in a subcarrier can be first estimated based on pilot subcarriers in the OFDM symbol using spline interpolation, for example as illustrated above in FIGS. 7 through 19. The channel in the same subcarrier can be estimated a second time by combining an estimate of the subcarrier in the same subchannel of the previous OFDM symbol and an estimate of the subcarrier in the same subchannel of the next OFDM symbol, for example as illustrated in FIGS. 20A through 20C. The estimate of the subcarrier in the subchannel of the previous OFDM symbol and the estimate of the subcarrier in the subchannel of the next OFDM symbol can be obtained by spline interpolation based on pilot subcarriers in the OFDM symbol or, if the subcarrier is a pilot subcarrier, based on the expected pilot value. A third estimate of the subchannel can then be produced by combining the first and the second estimates of the channel in the subcarrier, for example in a linear combination with a coefficient of ½.

Figure 21A:
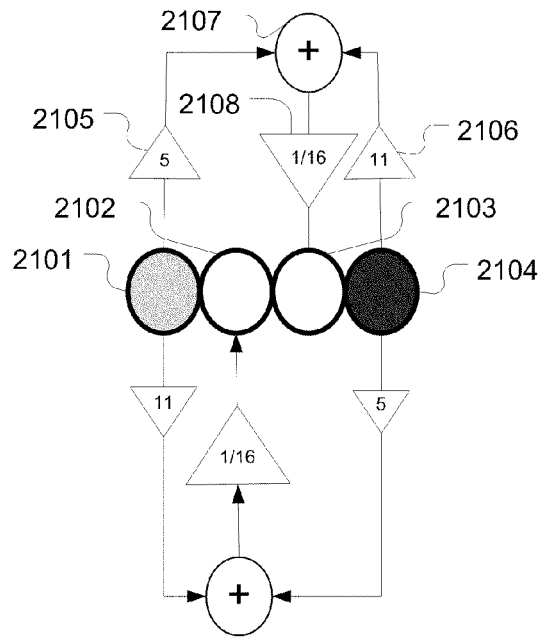
FIG. 21A illustrates an example of channel estimation in a data subcarrier in a dedicated data subchannel through the weighted sum of the channel in two nearest estimated subcarriers, in accordance with various embodiments.

In various embodiments, the channel in each of the data subcarriers 107 in dedicated data subchannels 102 as illustrate in FIG. 1, which were omitted in the illustration of FIG. 5, can be estimated based on the estimated channel in the two nearest subcarriers. FIG. 21A illustrates an example of channel estimation in a data subcarrier in a dedicated data subchannel through the weighted sum of the channel in the two nearest estimated subcarriers. In the example illustrated, the gray circle is a data subcarrier in a shared subchannel 2101; the black circle is a pilot subcarrier in a shared or a continuous subchannel 2104; the white circles are data subcarriers in dedicated data subchannels 2102, 2103. To estimate the channel in the data subcarrier 2103, the estimated channel in the data subcarrier 2101 can be multiplied by 5 in a multiplier 2105 and the estimated channel in the pilot subcarrier 2104 can be multiplied by 11 in a multiplier 2106. The products can be added in an adder 2107 and divided by 16 in a divider 2108 to estimate the channel in the data subcarrier 2103. The channel in the subcarrier 2102 can be similarly estimated by producing a weighted sum with a weight of 11 being applied to the data subcarrier 2101 and a weight of 5 being applied to the pilot subcarrier 2104. The channel in the data subcarrier 2101 and the pilot subcarrier 2104 can be estimated based on the methods described above in the specification.

Figure 21B:
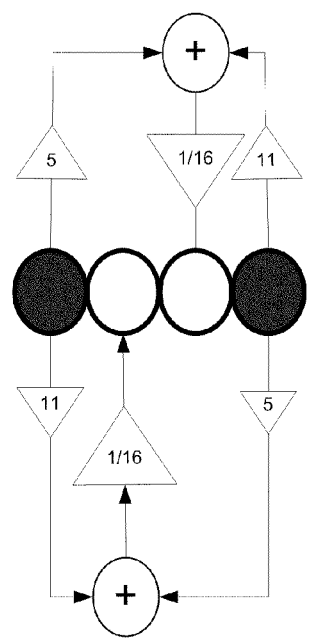
FIG. 21B illustrates an example of channel estimation in a data subcarrier in a dedicated data subchannel through the weighted sum of the channel in two nearest estimated pilot subcarriers, in accordance with various embodiments.

FIG. 21B illustrates an example of channel estimation in a data subcarrier in a dedicated data subchannel through the weighted sum of the channel in two nearest estimated pilot subcarriers, in accordance with various embodiments.

Figure 21C:
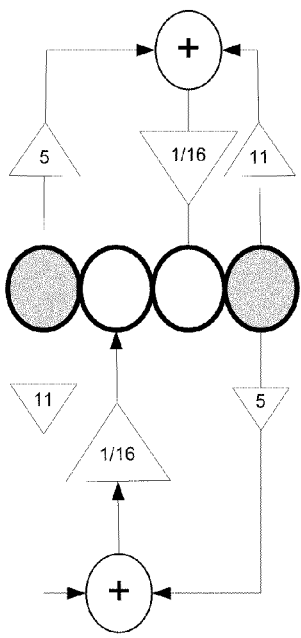
FIG. 21C illustrates an example of channel estimation in a data subcarrier in a dedicated data subchannel through the weighted sum of the channel in two nearest estimated data subcarriers, in accordance with various embodiments.

FIG. 21C illustrates an example of channel estimation in a data subcarrier in a dedicated data subchannel through the weighted sum of the channel in two nearest estimated data subcarriers, in accordance with various embodiments.

Figure 21D:
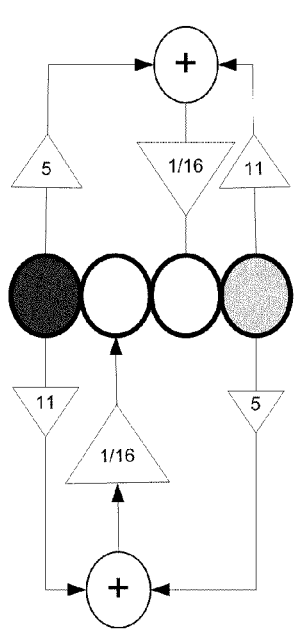
FIG. 21D illustrates an example of channel estimation in a data subcarrier in a dedicated data subchannel through the weighted sum of the channel in a nearest estimated data subcarrier and a nearest estimated pilot subcarrier, in accordance with various embodiments.

FIG. 21D illustrates an example of channel estimation in a data subcarrier in a dedicated data subchannel through the weighted sum of the channel in a nearest estimated data subcarrier and a nearest estimated pilot subcarrier, in accordance with various embodiments.

In various embodiments, the channel in each of the data subcarriers 107 in dedicated data subchannels 102, as illustrated in FIG. 1, can be estimated in a linear combination of the estimated channels in the two nearest subcarriers as illustrated in the examples in FIGS. 21B through 21C. In various embodiments, the linear combination, as illustrated in the examples in FIGS. 21B through 21C, can be performed using different weights in the linear combination than illustrated. In various embodiments, different methods, such as non-linear combination, can be used to estimate the channel in each of the data subcarriers 107 in dedicated data subchannels 102 based on the estimated channels in the two nearest subcarriers.

Embodiments of the system and method described herein facilitate estimating the channel in OFDM transmission. Although the components and modules illustrated herein are shown and described in a particular arrangement, the arrangement of components and modules may be altered to perform the described functions and processes in a different manner. In other embodiments, one or more additional components or modules may be added to the described systems, and one or more components or modules may be removed from the described systems. Alternate embodiments may combine two or more of the described components or modules into a single component or module.

While certain exemplary embodiments have been described and shown in the accompanying drawings, it is to be understood that such embodiments are merely illustrative of and not restrictive on the broad invention, and that this invention is not limited to the specific constructions and arrangements shown and described, since various other modifications may occur to those ordinarily skilled in the art. Accordingly, the specification and drawings are to be regarded in an illustrative rather than a restrictive sense.

Reference in the specification to "an embodiment," "one embodiment," "some embodiments," "various embodiments" or "other embodiments" means that a particular feature, structure, or characteristic described in connection with the embodiments is included in at least some embodiments, but not necessarily all embodiments. References to "an embodiment," "one embodiment," or "some embodiments" are not necessarily all referring to the same embodiments. If the specification states a component, feature, structure, or characteristic "may," "can," "might," or "could" be included, that particular component, feature, structure, or characteristic is not required to be included. If the specification or Claims refer to "a" or "an" element, that does not mean there is only one of the element. If the specification or Claims refer to an "additional" element, that does not preclude there being more than one of the additional element.

The invention claimed is:
1. A method comprising:
receiving an Orthogonal Frequency-Division Multiplexing (OFDM) signal with scatter pilots; and
producing a first estimate of a channel in a first estimated data subcarrier in a subchannel in an OFDM symbol of the OFDM signal through interpolation, the interpolation being based on estimated channels in both of:

(a) at least one pilot subcarrier that is in the same subchannel as the data subcarrier but in a different OFDM symbol than the data subcarrier; and (b) at least two pilot subcarriers that are in the same OFDM symbol as the data subcarrier but a different subchannel than the data subcarrier, wherein the estimated channels in the at least two pilot subcarriers in the same OFDM symbol are determined by:

assigning a corresponding weight to each of the at least two pilot subcarriers that are in the same OFDM symbol as the data subcarrier but the different subchannel than the data subcarrier based on impulse response of a filter;

in response to detecting that one of the at least two pilot subcarriers is missing, assigning the corresponding weight of the missing pilot subcarrier to a closest existing pilot subcarrier of the at least two pilot subcarriers, such that the closest existing pilot subcarrier is applied at least twice with two different weights to determine the estimated channel;

multiplying each of the at least two pilot subcarriers by the corresponding weight to compute two or more products;

adding the two or more products in an adder to compute a sum; and dividing the sum by a total weight assigned to all of the at least two pilot subcarriers.

2. The method of claim 1, wherein the interpolation is based on estimated channels in at least three pilot subcarriers in the OFDM symbol.

3. The method of claim 1, wherein the first estimate of the channel in the first estimated data subcarrier is produced through Spline interpolation.

4. The method of claim 1, further comprising:
producing a second estimate of the channel in the first estimated data subcarrier based on an estimate of the channel in a subcarrier in the same subchannel in a previous OFDM symbol and an estimate of the channel in a subcarrier in the same subchannel in a succeeding OFDM symbol.

5. The method of claim 4, wherein the second estimate of the channel in the first estimated data subcarrier is produced by taking an average of an estimated channel in a subcarrier in the same subchannel in a previous OFDM symbol and an estimate of a channel in a subcarrier in the same subchannel in a succeeding OFDM symbol.

6. The method of claim 4, further comprising:
producing a third estimate of the channel in the first estimated data subcarrier based on the first estimate of the channel in the first estimated data subcarrier and the second estimate of the channel in the first estimated data subcarrier.

7. The method of claim 6, wherein the third estimate of the channel in the first estimated data subcarrier is produced through a linear combination of the first estimate of the channel in the first estimated data subcarrier and the second estimate of the channel in the first estimated data subcarrier.

8. The method of claim 6, further comprising estimating a channel in a data subcarrier in a designated data subchannel based on the estimated channels in two nearest subcarriers in shared subchannels, wherein the two nearest subcarriers in shared subchannels are in the same OFDM symbol as the data subcarrier in the designated data subchannel.

9. The method of claim 6, further comprising estimating a channel in a data subcarrier in a designated data subchannel through a weighted sum of the estimated channels in two nearest subcarriers in shared subchannels, which two nearest subcarriers in shared subchannels are in the same OFDM symbol as the data subcarrier in the designated data subchannel.

10. The method of claim 1, wherein the corresponding weight is based on a peak in the impulse response of the filter corresponding to the pilot signal received by the filter.

11. An apparatus comprising:
an antenna configured to receive an Orthogonal Frequency-Division Multiplexing (OFDM) signal with scattered pilots; and a Channel Estimator configured to produce a first estimate of a channel in a first estimated data subcarrier in a shared subchannel in an OFDM symbol of the received OFDM signal through interpolation. the interpolation being based at least in part on estimated channels in both of:

(a) at least one pilot subcarrier in the same subchannel as the data subcarrier but a different OFDM symbol than the data subcarrier; and (b) at least two pilot subcarriers in the same OFDM symbol as the data subcarrier but a different subchannel than the data subcarrier, wherein the estimated channels in the at least two pilot subcarriers in the same OFDM symbol are determined by:

assigning a corresponding weight to each of the at least two pilot subcarriers that are in the same OFDM symbol as the data subcarrier but the different subchannel than the data subcarrier, wherein the corresponding weight is based at least in part on an impulse response of a filter;

in response to detecting that one of the at least two pilot subcarriers is missing, assigning the corresponding weight of the missing pilot subcarrier to a closest existing pilot subcarrier of the at least two pilot subcarriers, such that the closest existing pilot subcarrier is applied at least twice with two different weights to determine the estimated channel;

multiplying each of the at least two pilot subcarriers by the corresponding weight to compute two or more products;

adding the two or more products in an adder to compute a sum; and dividing the sum by a total weight assigned to all of the at least two pilot subcarriers.

12. The apparatus of claim 11, wherein the Channel Estimator is further configured to produce the first estimate of the channel in the first estimated data subcarrier in the shared subchannel through Spline interpolation.

13. The apparatus of claim 11, wherein the Channel Estimator is further configured to:
produce a second estimate of the channel in the first estimated data subcarrier in the shared subchannel based on an estimate of a channel in a subcarrier in a previous OFDM symbol in the same subchannel and an estimate of a channel in a subcarrier in a succeeding OFDM symbol in the same subchannel.

14. The apparatus of claim 13, wherein the Channel Estimator is further configured such that the second estimate of the channel in the first estimated data subcarrier in the shared subchannel is produced by taking an average of the estimate of the channel in the subcarrier in the previous OFDM symbol in the same subchannel and the estimate of the channel in the subcarrier in the succeeding OFDM symbol in the same subchannel.

15. The apparatus of claim 13, wherein the Channel Estimator is further configured to produce a third estimate of the channel in the first estimated data subcarrier in the shared subchannel based on the first estimate of the first estimated data subcarrier in the shared subchannel and the second estimate of the first estimated data subcarrier in the shared subchannel.

16. The apparatus of claim 15 wherein the Channel Estimator is further configured to estimate a channel in a data subcarrier in a designated data subcarrier based on the estimated channel of two nearest subcarriers in shared subchannels in the same OFDM symbol.

17. The apparatus of claim 15 wherein the Channel Estimator is further configured to estimate a channel in a data subcarrier in a designated data subcarrier through a weighted sum of the channels in two nearest subcarriers in shared subchannels in the same OFDM symbol.

18. The apparatus of claim 13 wherein the Channel Estimator is further configured such that the third estimate of the channel in the first estimated data subcarrier in the shared subchannel is produced through a linear combination of the first estimate of the channel in the first estimated data subcarrier in the shared subchannel and the second estimate of the channel in the first estimated data subcarrier in the shared subchannel.

19. An Orthogonal Frequency-Division Multiplexing (OFDM) receiver, comprising:
   an antenna configured to receive an OFDM signal with scattered pilots;
   a tuner configured to perform at least one of: amplify, filter or down-convert the OFDM signal;
   an analog-to-digital converter (ADC) configured to convert the OFDM signal to digital form;
   a filtering and synchronization module configured to filter and synchronize the OFDM signal;
   a Fast Fourier Transform (FFT) module configured to output OFDM symbols;
   a Channel Estimator configured to produce a first estimate of a channel in a first estimated data subcarrier in a shared subchannel in an OFDM symbol of the received OFDM signal through interpolation, the interpolation being based at least in part on estimated channels in both of:
   (a) at least one pilot subcarrier in the same subchannel as the data subcarrier but a different OFDM symbol than the data subcarrier; and
   (b) at least two pilot subcarriers in the same OFDM symbol as the data subcarrier but a different subchannel than the data subcarrier, wherein the estimated channels in the at least two pilot subcarriers in the same OFDM symbol are determined by:
      assigning a corresponding weight to each of the at least two pilot subcarriers that are in the same OFDM symbol as the data subcarrier but the different subchannel than the data subcarrier, wherein the corresponding weight is based at least in part on impulse response of a filter;
      in response to detecting that one of the at least two pilot subcarriers is missing, assigning the corresponding weight of the missing pilot subcarrier to a closest existing pilot subcarrier of the at least two pilot subcarriers, such that the closest existing pilot subcarrier is applied at least twice with two different weights to determine the estimated channel;
      multiplying each of the at least two pilot subcarriers by the corresponding weight to compute two or more products;
      adding the two or more products in an adder to compute a sum; and
      dividing the sum by a total weight assigned to all of the at least two pilot subcarriers.

* * * * *

UNITED STATES PATENT AND TRADEMARK OFFICE
CERTIFICATE OF CORRECTION

| | |
|---|---|
| PATENT NO. | : 8,675,749 B2 |
| APPLICATION NO. | : 12/790743 |
| DATED | : March 18, 2014 |
| INVENTOR(S) | : Mahdi Khoshgard et al. |

It is certified that error appears in the above-identified patent and that said Letters Patent is hereby corrected as shown below:

In the Claims:

Claim 8, column 11, line 61 delete "subcarricrs"

and insert -- subcarriers --

Signed and Sealed this
Sixteenth Day of September, 2014

Michelle K. Lee
*Deputy Director of the United States Patent and Trademark Office*